United States Patent
Lim et al.

(10) Patent No.: US 11,288,885 B1
(45) Date of Patent: Mar. 29, 2022

(54) SYSTEM AND METHOD FOR EMERGENCY CALL TAKER MENTAL HEALTH IMPROVEMENT

(71) Applicant: MOTOROLA SOLUTIONS, INC., Chicago, IL (US)

(72) Inventors: Bing Qin Lim, Jelutong (MY); Moh Lim Sim, Bayan Lepas (MY); Cecilia Liaw Wei Ling, Butterworth (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/118,643

(22) Filed: Dec. 11, 2020

(51) Int. Cl.
| | |
|---|---|
| *H04N 7/14* | (2006.01) |
| *H04L 29/06* | (2006.01) |
| *G06T 5/20* | (2006.01) |
| *H04W 12/02* | (2009.01) |
| *H04N 5/272* | (2006.01) |

(Continued)

(52) U.S. Cl.
CPC .......... *G06V 20/20* (2022.01); *G06F 21/6254* (2013.01); *G06T 11/001* (2013.01); *G06T 11/60* (2013.01); *G06V 20/41* (2022.01); *H04L 63/105* (2013.01); *H04M 1/72439* (2021.01); *H04M 1/72454* (2021.01); *H04N 5/265* (2013.01); *H04N 7/147* (2013.01); *H04W 12/02* (2013.01); *G06T 2200/24* (2013.01)

(58) Field of Classification Search
CPC . H04L 63/102; H04L 63/105; H04L 65/1069; H04L 65/4015; H04L 65/80; H04M 5/5116; H04M 3/5141; H04M 1/57; H04M 1/72436; H04M 1/72439; H04M 1/72454; H04M 2250/52; H04N 2007/145; H04N 7/142; H04N 7/147; H04N 7/15; H04N 7/183; H04W 4/90; H04W 12/08; H04W 4/021; H04W 4/029; G06K 9/00671; G06K 9/00718; G06F 3/165; G06V 20/20
See application file for complete search history.

(56) References Cited

U.S. PATENT DOCUMENTS

| | | | |
|---|---|---|---|
| 8,281,370 B2 * | 10/2012 | Robbins | .................. H04L 63/10 726/4 |
| 10,630,937 B1 | 4/2020 | Low et al. | |

(Continued)

OTHER PUBLICATIONS

T. Orekondy, M. Fritz and B. Schiele, "Connecting Pixels to Privacy and Utility: Automatic Redaction of Private Information in Images," 2018 IEEE/CVF Conference on Computer Vision and Pattern Recognition, Salt Lake City, UT, 2018, pp. 8466-8475, doi: 10.1109/CVPR.2018.00883.

(Continued)

*Primary Examiner* — Jin Cheng Wang

(57) ABSTRACT

Techniques for emergency call taker mental health improvement are provided. Incident scene related media that captures a visual representation of a scene associated with an incident is received. At least one object shown in the incident related media that may cause emotional distress to an emergency call taker that will view the incident related media is determined. The object is obscured in the incident scene related media to create obscured incident related media. A textual description of the object is generated. The textual description of the object is included in the obscured incident related media. The obscured incident related media is displayed to the emergency call taker.

20 Claims, 6 Drawing Sheets

(51) Int. Cl.

| | |
|---|---|
| *G06F 3/0484* | (2022.01) |
| *G06K 9/00* | (2022.01) |
| *G06T 11/00* | (2006.01) |
| *H04N 5/265* | (2006.01) |
| *G06T 11/60* | (2006.01) |
| *G06F 21/62* | (2013.01) |
| *H04M 1/72439* | (2021.01) |
| *H04M 1/72454* | (2021.01) |
| *G06V 20/20* | (2022.01) |
| *G06V 20/40* | (2022.01) |

(56) References Cited

U.S. PATENT DOCUMENTS

| | | | |
|---|---|---|---|
| 2004/0049780 A1 | 3/2004 | Gee | |
| 2013/0086109 A1* | 4/2013 | Huang | G06F 16/244 707/770 |
| 2015/0087258 A1* | 3/2015 | Barnes | H04W 4/90 455/404.2 |
| 2018/0176474 A1* | 6/2018 | Blanco | G06F 40/169 |
| 2018/0189505 A1* | 7/2018 | Ghafourifar | G06F 21/6209 |
| 2019/0174289 A1* | 6/2019 | Martin | H04L 67/02 |
| 2019/0189159 A1* | 6/2019 | Gan | G06K 9/00744 |
| 2019/0304506 A1* | 10/2019 | Michaud | G11B 27/00 |
| 2019/0348076 A1* | 11/2019 | Hershfield | H04N 7/181 |
| 2019/0364126 A1 | 11/2019 | Todd | |
| 2019/0373210 A1* | 12/2019 | Nguyen | G06K 9/00771 |
| 2020/0027200 A1 | 1/2020 | Celestini | |
| 2020/0042797 A1 | 2/2020 | Lee et al. | |
| 2020/0126645 A1* | 4/2020 | Robbins | H04L 63/0861 |
| 2020/0309541 A1* | 10/2020 | Lavy | G06K 9/6256 |
| 2021/0004486 A1* | 1/2021 | Adams | H04L 9/30 |

OTHER PUBLICATIONS

Zajac, Tomasz, et al.: "Call Management System for Incoming video Calls at a Command Center", application serial No. PCT/PL2019/050080 filed; Dec. 20, 2019, all pages.

* cited by examiner

SYSTEM AND METHOD FOR EMERGENCY CALL TAKER MENTAL HEALTH IMPROVEMENT

BACKGROUND

Emergency call taking systems (e.g. 911 in the United States, etc.) are ever increasing in their capabilities. In currently deployed systems, it is typical that an emergency call taker, upon receipt of a call to 911 (or call to an equivalent emergency number), will have large amounts of information at their disposal. Such information can include caller location (for both wired and wireless callers), history of calls from that number (e.g. frequent prank calls, disturbed persons, etc.), and other such information. More recent developments have also allowed persons seeking emergency assistance to send requests via text message (e.g. text to 911, etc.). The availability of such information aids in allowing an emergency call taker and/or dispatcher in dispatching appropriate assistance (e.g. police, fire, emergency medical services, etc.) to the caller's location.

Cameras have become ubiquitous. Large numbers of adults (and many children) carry with them, at all times, a device capable of taking photographs and/or recording video. The most common such device is a smart phone, although other such devices exist (e.g. tablet computer, laptop computer, action camera, standalone camera, etc.). In many cases, video would be very helpful in aiding a call taker understand the nature of the emergency being called about in order to cause the most appropriate resources to be dispatched to the scene of an emergency. Next generation emergency call handling systems may include the ability for an emergency caller to send either live streamed or recorded images/video of an incident scene to the emergency call taker.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
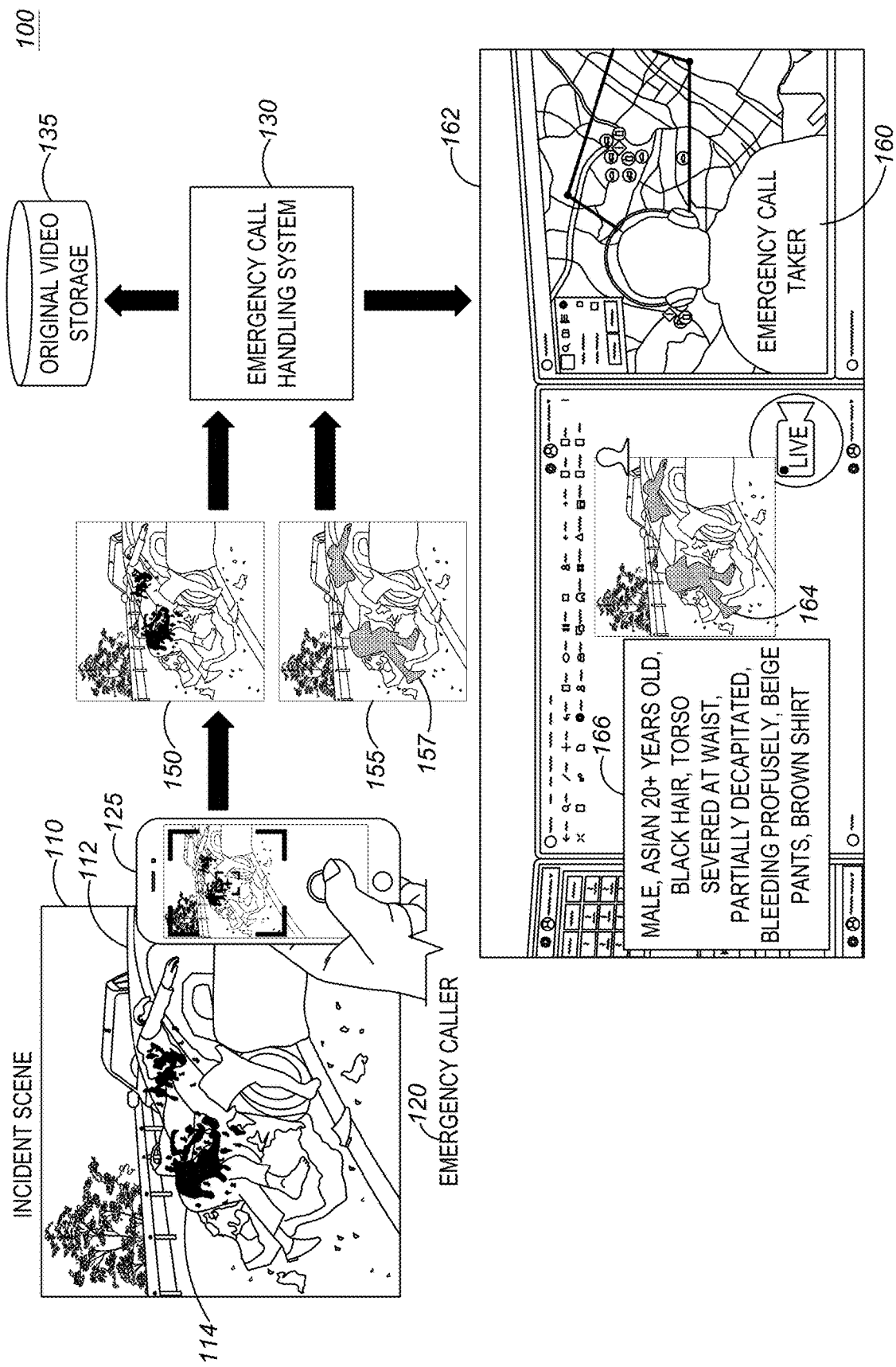
FIG. 1 is an example environment in which the emergency call taker mental health improvement techniques described herein can be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The availability of incident scene video may greatly improve the efficiency of the response by public safety personnel (e.g. police, fire, emergency medical services, etc.), who will hereafter be referred to as first responders. For example, video of a car accident scene may reveal that access to the scene is blocked by fire, and that first responders should approach from the west. As yet another example, in a case involving injuries, video of injured persons may allow a call taker and/or dispatcher to determine the appropriate number and types of units to dispatch. For example, for minor injuries, a basic life support ambulance may be sent, while for more serious injuries a mobile intensive care unit may be dispatched. As should be clear, availability of video of an incident scene could be very helpful when formulating a response plan to the emergency incident.

A problem may arise with respect to the mental health of emergency call takers when constantly exposed to images and/or video of an incident scene. The job of an emergency call taker is inherently stressful. Members of the public generally call 911 when experiencing traumatic events in their lives (e.g. victim of a crime, accident, medical emergency, etc.) and this tends to be a very infrequent occurrence. A 911 call taker can expect that almost all (if not all) calls that they will handle during a shift are from somebody experiencing what could potentially be the worst day of their lives. Spending their entire work day assisting people who are experiencing what might be the most traumatic event in their lives can take a toll on the mental health of an emergency call taker. The addition of images and/or video of the incident scene does not improve the emergency call taker's mental health situation. The emergency call taker now not only has to hear about the trauma being experienced by the caller, but must also see it as well.

The mental health issues (e.g. post-traumatic stress disorder (PTSD), stress, anxiety, depression, etc.) experienced by emergency call takers is severe enough when dealing in an audio only environment. Callers to 911 may be hysterical, screaming, crying, and behaving in other stress inducing ways. The audio may further include disturbing sounds, such as gun shots, sounds of violence, etc.

The addition of images and/or video, which will hereinafter be referred to as video for ease of description, may unnecessarily contribute to the deterioration of the mental health of the emergency call taker. Although in many cases, as described above, video of the incident scene may be helpful, in other cases, it may serve no purpose, but still exposes the emergency call taker to mental anguish.

For example, consider the case of a 911 caller who is reporting a person who has committed suicide by jumping off a twenty story building. The caller may verbally report that the condition of the injuries is extraordinarily severe due to the height from which the victim jumped. In such a case, the emergency call taker's response (e.g. dispatching sophisticated medical rescue units, etc.) would not change based on viewing the video of the incident scene. In other words, there is nothing to gain by exposing the emergency call taker to traumatic imagery if the actions of the call taker do not change based on the imagery.

The techniques described herein overcome the problem of causing unnecessary mental anguish to emergency call takers by intercepting incident related video received from emergency callers. The original video, as received, is saved for evidentiary and other purposes. A video copied from the original video is processed to identify objects in the video that may be disturbing to the mental health of the emergency call taker. The identified objects may be obscured in one of several different ways. The video is then enhanced to include textual descriptions of the objects that were obscured. The processed video is then presented to the emergency call taker.

By initially obscuring objects that may be harmful to the mental health of the emergency call taker, the emergency call taker can be protected from seeing disturbing imagery. The inclusion of the textual description ensures that the emergency call taker still has available the nature and the context of the object that has been obscured, thus ensuring that the information conveyed by the video is not lost. The emergency call taker can then make decisions without having to be exposed to the disturbing imagery.

In some cases, the textual description of the objects in the incident scene that have been obscured is not enough to allow the emergency call taker to make decisions on the proper course of action. For example, in the case of the suicide victim described above, viewing the type and nature of the injuries may allow the emergency call taker to determine if an ambulance or the coroner should be dispatched. The techniques described herein allow for the emergency call taker to selectively unobscure some or all of the obscured objects in the video. Although exposure to the imagery may cause mental anguish to the emergency call taker, the decision to un-obscure the imagery is left in the hands of the emergency call taker.

A method is provided. The method includes receiving incident related media, the incident related media capturing a visual representation of a scene associated with an incident. The method further includes determining at least one object shown in the incident related media that may cause emotional distress to an emergency call taker that will view the incident related media. The method further includes obscuring the at least one object in the incident related media to create obscured incident related media. The method further includes generating a textual description of the at least one object. The method further includes including the textual description of the at least one object in the obscured incident related media. The method further includes displaying the obscured incident related media to the emergency call taker.

In one aspect, generating the textual description of the at least one object further comprises generating a reason why the at least one object is being obscured. In one aspect, the method further includes storing an unobscured version of the incident related media. In one aspect, the method includes reviewing, by a supervisor, the generated textual description of the at least one object and modifying, by the supervisor, the generated description of the at least one object prior to displaying the obscured incident related media to the emergency call taker.

In one aspect, the method includes receiving an indication from the emergency call taker to un-obscure at least a portion of the obscured incident related media and un-obscuring the at least a portion of the obscured incident related media. In one aspect the method further includes determining multiple objects in the incident related media that may cause emotional distress to the emergency call taker and repeating the steps of obscuring, generating, and including for each object of the multiple objects, wherein each determined object is obscured using a different color code. In one aspect, the method further includes receiving an indication from the emergency call taker to un-obscure at least one object of the multiple objects in the obscured incident related media and un-obscuring the at least one object in the obscured incident related media.

A device comprising a processor and a memory is provided. The memory is couple to the processor and contains a set of instructions thereon that when executed by the processor cause the processor to receive incident related media, the incident related media capturing a visual representation of a scene associated with an incident. The instructions further cause the processor to determine at least one object shown in the incident related media that may cause emotional distress to an emergency call taker that will view the incident related media. The instructions further cause the processor to obscure the at least one object in the incident related media to create obscured incident related media. The instructions further cause the processor to generate a textual description of the at least one object. The instructions further cause the processor to include the textual description of the at least one object in the obscured incident related media. The instructions further cause the processor to display the obscured incident related media to the emergency call taker.

In one aspect, generating the textual description of the at least one object further comprises instructions that cause the processor to generate a reason why the at least one object is being obscured. In one aspect, the instructions further cause the processor to store an unobscured version of the incident related media. In one aspect, the instructions further cause the processor to review, by a supervisor, the generated textual description of the at least one object and modify, by the supervisor, the generated description of the at least one object prior to displaying the obscured incident related media to the emergency call taker.

In one aspect, the instructions cause the processor to receive an indication from the emergency call taker to un-obscure at least a portion of the obscured incident related media and un-obscure the at least a portion of the obscured incident related media. In one aspect, the instructions cause the processor to determine multiple objects in the incident related media that may cause emotional distress to the emergency call taker and repeat the steps of obscuring, generating, and including for each object of the multiple objects, wherein each determined object is obscured using a different color code. In one aspect, the instructions cause the processor to receive an indication from the emergency call taker to un-obscure at least one object of the multiple objects in the obscured incident related media and un-obscure the at least one object in the obscured incident related media.

A non-transitory processor readable medium containing a set of instructions thereon is provided. The instructions on the medium, when executed by the processor cause the processor to receive incident related media, the incident related media capturing a visual representation of a scene associated with an incident. The instructions on the medium further cause the processor to determine at least one object shown in the incident related media that may cause emotional distress to an emergency call taker that will view the incident related media. The instructions on the medium further cause the processor to obscure the at least one object in the incident related media to create obscured incident related media. The instructions on the medium further cause the processor to generate a textual description of the at least one object. The instructions on the medium further cause the processor to include the textual description of the at least one object in the obscured incident related media. The instructions on the medium further cause the processor to display the obscured incident related media to the emergency call taker.

In one aspect, generating the textual description of the at least one object further comprises instructions on the medium that cause the processor to generate a reason why the at least one object is being obscured. In one aspect, the instructions further cause the processor to store an unobscured version of the incident related media.

In one aspect, the instructions on the medium cause the processor to receive an indication from the emergency call taker to un-obscure at least a portion of the obscured incident related media and un-obscure the at least a portion of the obscured incident related media. In one aspect, the instructions on the medium cause the processor to determine multiple objects in the incident related media that may cause emotional distress to the emergency call taker and repeat the steps of obscuring, generating, and including for each object of the multiple objects, wherein each determined object is obscured using a different color code. In one aspect, the instructions on the medium cause the processor to receive an indication from the emergency call taker to un-obscure at least one object of the multiple objects in the obscured incident related media and un-obscure the at least one object in the obscured incident related media.

Further advantages and features consistent with this disclosure will be set forth in the following detailed description, with reference to the figures.

FIG. 1 is an example environment 100 in which the emergency call taker mental health improvement techniques described herein can be implemented. Environment 100 depicts an incident scene 110. In the example shown in FIG. 1, the incident scene is a severe car accident. There is a severely damaged vehicle 112. On top of the vehicle is a person who is severely injured 114.

Although the nature of the injuries may be difficult to determine based on the drawings, assume that the injured person is an Asian male that is in their mid-twenties, and has black hair. The person may be wearing beige pants and a brown shirt. The person has experienced severe injuries, including his torso being severed at the waist, partial decapitation, and profuse bleeding. As should be clear, viewing such severe injuries could have the potential to be traumatic to a person viewing the incident scene.

Environment 100 may also include an emergency caller 120. For example, the emergency caller may be someone who witnessed the car accident or just happened to come across the aftermath of the car accident. The emergency caller may be in possession of a device 125 that is capable of capturing video of the incident scene 110. For example, the device may be a smartphone that includes a camera. Other devices could include a tablet computer, a standalone camera, a vehicle dashcam, a sports camera, or any other type of device capable of capturing and transmitting a video.

The emergency caller 120 may make a call to emergency call handling system 130. An example of a device that may implement the emergency call handling system is described in further detail with respect to FIG. 5. What should be understood is that emergency call handling system may receive emergency calls (e.g. calls to 911, etc.) from emergency callers. Emergency call handling systems may also receive video from emergency callers (i.e. incident related media, etc.). For example, the emergency caller 120 may send video 150 of the incident scene 110 to the emergency call handling system 130. In some cases, the video may be streamed live. In other cases, the video may be sent as a multimedia file. Regardless of how it is sent, video of the incident scene may be received by the emergency call handling system.

The emergency call handling system 130 may be coupled to an original video storage 135. As mentioned above, the video 150 that was sent from the emergency caller to the emergency call handling system is evidence that may need to be used later in an unaltered format. As such, the video that was originally sent is stored for potential later use.

The emergency call handling system 130 may then analyze the received video 150 to detect objects within the received video to determine if any of those objects may cause mental distress to an emergency call taker 160 if viewed. It should be noted that there are many available techniques to analyze a video and determine objects (e.g. people, vehicles, etc.) and characteristics of those objects (e.g. male, age, hair color, clothing description, injuries, etc.). The techniques described herein may be utilized with any of those known or future developed techniques. Determining if a particular object is mentally disturbing may, in some cases, be based on the presence of one or more factors (e.g. presence of an injury, presence of bodily fluids (e.g. blood, etc.), severed body parts, etc.). What should be understood is that the techniques described herein may make use of any available system for identifying objects in a video and determining characteristics of those objects that may be mentally disturbing.

In addition to the automatic analysis that may be performed, the techniques described herein may also provide for a human review prior to presenting the incident related media to the emergency call taker 160. For example, a supervisor (not shown) may also review the identified objects to identify objects that may be mentally disturbing. For example, a supervisor may have knowledge that a particular call taker is having a very difficult workday, due to the type/number/nature of the calls that have come in that day. Objects that may normally not be considered mentally disturbing, may be for this particular emergency call taker. Thus, the supervisor may wish to designate certain objects to be obscured, even though the automated system did not identify those objects.

In another example, the threshold of determining if an object may be mentally disturbing can be automatically changed based on accumulated working hours (total hours worked on the shift), number of calls received, type of shift (e.g. night shift versus day shift), number of severely traumatic incidents handled, report of a mental health status of an emergency call taker, camera/biosensor data indicating emergency call taker mental health status, and/or profile of emergency call taker indicating that the emergency call taker has been involved in a specific traumatic experience in the past. For example, an object would be more likely to be determined as mentally disturbing (reduce the threshold) if the emergency call taker is on the night shift and the threshold would continue to be reduced as the emergency call taker continues answering 911 calls. The threshold may be further reduced when the call that the emergency call taker has just handled is a very traumatic one (emergency call taker may have already been mentally impacted and needs some time to recover from that). In another example, an emergency call taker that has data in the 911 system that indicates a vulnerability to mental stress may automatically trigger further lowering of threshold when the camera (camera in front of 911 monitor that capturing 911 emergency call taker live video) or biosensor (e.g. heartbeat sensor) detects an increase stress or mental impact to the emergency call taker (e.g. increase heartbeat, tears in eye, etc.). In another example, if the profile of the emergency call taker indicates the emergency call taker has experienced in the past a loss of his/her child in a drowning incident, any video depicting a child drowning incident would have the threshold lowered automatically.

In another example, the level of obscuring or redaction (e.g. opacity level, number of lines and area size/shape of the obscured or redacted object) can be automatically changed based on accumulated working hours (total hours worked on the shift), number of calls received, type of shift (e.g. night shift versus day shift), number of severely traumatic incidents handled, report of a mental health status of an emergency call taker, camera/biosensor data indicating emergency call taker mental health status, and/or profile of emergency call taker indicating that the emergency call taker has been involved in specific traumatic experience in the past. For example, the opacity level of the obscuring or redaction is higher (less revealing or visible) for an emergency call taker who has worked for a long time, compared to an emergency call taker who has just started to work.

In the present example, the severely injured person 114 may cause the emergency call taker 160 mental distress if viewed. The emergency call handling system may then obscure the object (e.g. the severely injured person) to create a version of the video 155 in which distressing objects are obscured (i.e. obscured incident related media). The version of video 155 which has an obscuring shape is dynamically changed based on different angles if the emergency caller 120 moves around in the incident scene 110 while taking live video or recording video that is sent to the emergency call handling system.

Obscuring the object that may cause mental distress can be done in many ways, and the techniques described herein are not dependent on any specific technique. In one example, obscuring the object may be done by blurring the object, such that the details of the disturbing object are not discernible. Another example may be to replace the object with an icon or a pictorial image (that would not be mentally disturbing to the emergency call taker). Another example technique may be to replace the object with a pattern (e.g. hash marks, stripes, etc.) completely so that the details of the object are completely omitted. As yet another example, the object may be replaced with a solid fill color. As shown in FIG. 1, the object 157 representing the severely injured person 114 shown in the incident scene 110 is replaced by filling the outline of the object with a solid fill color (e.g. white, etc.). As such, no details of the injured person are visible.

The emergency call handling system 130 may be coupled with a workstation 162 where the emergency call taker 160 performs their job. The workstation may include one or more screens where the emergency call taker can perform functions of their job. For example, the workstation may include display screens to display information about the emergency call (e.g. location, time, caller information, etc.). In some cases, an emergency call taker may also act as a dispatcher, and workstation 162 may include computer aided dispatch (CAD) capabilities to allow the emergency call taker to dispatch first responders to the incident scene 110. What should be understood is that the workstation is where the emergency call taker interacts with the emergency call handling system.

The workstation 162 may display obscured incident related media 164 to the emergency call taker 160. As shown, because the displayed media is obscured, the emergency call taker need not initially be exposed to any disturbing objects (e.g. severely injured persons, etc.). As will be explained in further detail below, with respect to FIG. 3, in some cases it may be necessary to un-obscure portions of the obscured incident related media.

As mentioned above, analytics systems are available to identify objects and characteristics of those objects. The characteristics can be used to generate a textual description 166 of the object that has been obscured. As shown in FIG. 1, the generated textual description describes, in text, the characteristics of the object being obscured (e.g. Male, Asian 20+ Years Old, black hair, torso severed at waist, partially decapitated, bleeding profusely, beige pants, brown shirt). Although the description may itself be somewhat mentally disturbing, it is not as bad as the actual visual representation. More importantly, the emergency call taker is able to obtain the information related to the object, without having to actually view the unobscured object.

The generated textual description 166 may also include a reason why the object was obscured. As mentioned above, rules (which may be user configurable) may exist to determine when an identified object is considered to have the potential to cause mental health issues for emergency call takers 160. However, not all call takers may respond the same way to all images. For example, the presence of blood may not be considered traumatic by all call takers. If the presence of blood was the reason why the object was obscured, and that is not particularly traumatic for a particular emergency call taker, then that object may be un-obscured at the direction of the emergency call taker.

In some implementations, the system may keep track of which objects are not mentally disturbing to individual call takers. For example, an initial rule may be that an image including blood is considered potentially mentally disturbing, and the blood object is obscured. If a particular call taker repeatedly un-obscures such objects, the system 130 may learn that the presence of blood is not considered mentally disturbing to that particular emergency call taker 160. In the future, the system may no longer obscure blood objects for that specific emergency call taker.

Just as above wherein a supervisor may have the ability to select an object to be obscured that was not selected by the system, the supervisor may also modify the generated text description. For example, a description of severe injuries (e.g. severe injuries to a child), may be sufficiently disturbing to an emergency call taker in and of itself. The supervisor may modify the generated text description to be less traumatic. Likewise, if the automated system did not generate a detailed enough description, a human supervisor could enhance the description.

Although emergency call handling system 130 is described as handling both the emergency call handling functions as well as the object detection, description, and obscuring functions, it should be understood that this was for ease of description only. In an actual implementation, the emergency call handling functions (e.g. receiving calls, interacting with emergency call takers, dispatching first responders, etc.) may be handled by traditional public safety systems, while the object detection, description, and obscuring functions may be handled by external systems (e.g. third party, could based, etc.). It should be understood that the techniques described herein are applicable regardless of where the functionality is implemented.

Figure 2:
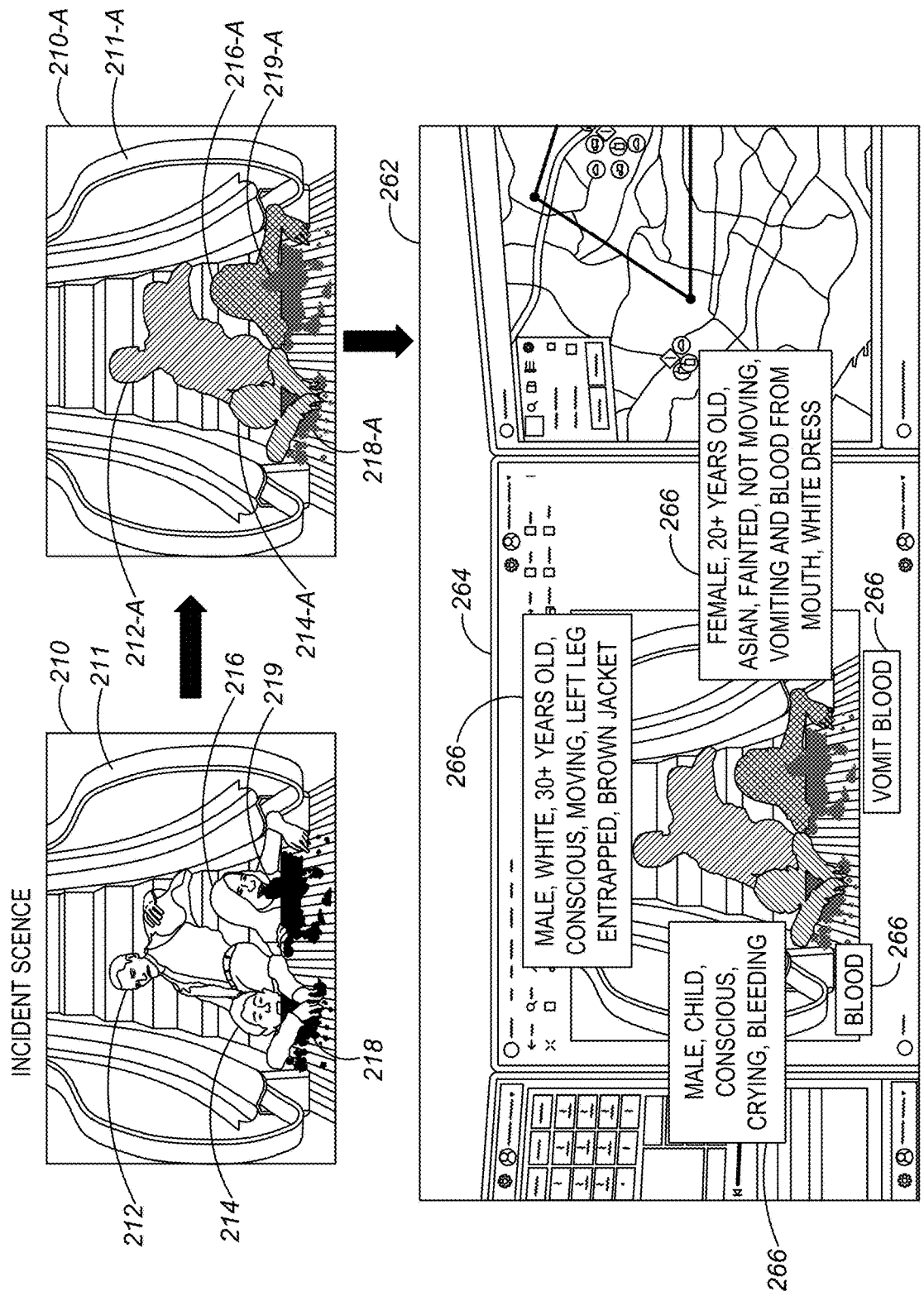
FIG. 2 is an example of an environment with multiple objects in which the emergency call taker mental health improvement techniques described herein can be implemented.

FIG. 2 is an example of an environment with multiple objects in which the emergency call taker mental health improvement techniques described herein can be implemented. FIG. 2 depicts an environment 200 that is similar to that shown with respect to FIG. 1. For ease of description, certain elements present in FIG. 1 are omitted from FIG. 2. However, it should be understood that the description of FIG. 2 should be taken with the context of FIG. 1 in mind.

Environment 200 depicts an incident scene 210. The incident scene depicts an incident involving an escalator 211. As shown, there are three injured persons, a white male 212, a male child 214, and an Asian female 216. In addition, there is the presence of blood 218 and blood and vomit 219. An emergency caller may call an emergency call handling system (e.g. 911, etc.) to report the incident and may provide incident related media to the emergency call handling system.

As above, the emergency call handling system may process the incident related media to determine objects that may be disturbing to emergency call taker to produce obscured incident related media 210-A. The system may determine that each of the injured persons, as well as the blood and blood/vomit may be considered mentally disturbing to the emergency call taker. The obscured incident related media may then include obscured versions for each of those objects. For example, the obscured incident related media may include an obscured male object 212-A, an obscured child object 214-A, an obscured female object 216-A, an obscured blood object 218-A, and an obscured blood/vomit object 219-A. It should be noted that the escalator itself should not be disturbing to the emergency call taker, so escalator 211-A is not obscured.

Each of the obscured objects may be obscured using a technique that allows for each object to be individually identified. For example, each object may be obscured by replacing the object with a different solid fill color. For example, the male victim object 212-A could be replaced with a solid green fill, the child victim object 214-A could be replaced with a solid yellow fill, the female victim object 216-A could be replaced with a red fill, and the blood 218-A and blood/vomit 219-A objects could be replaced with a solid blue fill.

In another example, each objects could be replaced with a different fill pattern (e.g. lines, stripes, dots, etc.). It yet another example, each object could be replaced with a color of a different shade (e.g. each object is assigned one of a plurality of shades of gray). In yet another example, each object may be replaced with a different icon or pictorial image. The particular technique used for distinguishing the different objects is relatively unimportant. What should be understood is that each object that is being obscured can be separately identified. The ability to separately identify each object may be useful when selectively un-obscuring an object, as will be described in further detail below, with respect to FIG. 3.

Just as above with respect to FIG. 1, the obscured incident related media 264 may be presented to the emergency call taker's workstation 262. Also, just as above, the descriptions 266 of each obscured object may be presented to the emergency call taker (not shown). The descriptions may be coded to correspond to whatever technique was used to distinguish the objects. For example, if each object was assigned a different color, the description of each object may utilize a background color that corresponds with the color used to obscure the object. Likewise, if a pattern was used, the same pattern may be used to distinguish the descriptions. In other implementations, the descriptions may all have the same format, but are placed in close proximity to the object being described.

Although FIG. 2 has been described in terms of objects representing individual victims, it should be understood that different classifications could be used as well. For example, different incident conditions could each be assigned a separate color code. For example, a separate color code could be assigned for amputation, burned body, cut by knife, shot by gun, drowning, strangulation, struck by lightning, and/or fall related death. The color code could be utilized by the emergency call taker to understand the nature of the reason why the object has been obscured and may not necessarily require the generated textual description to include the nature of the trauma.

Figure 3:
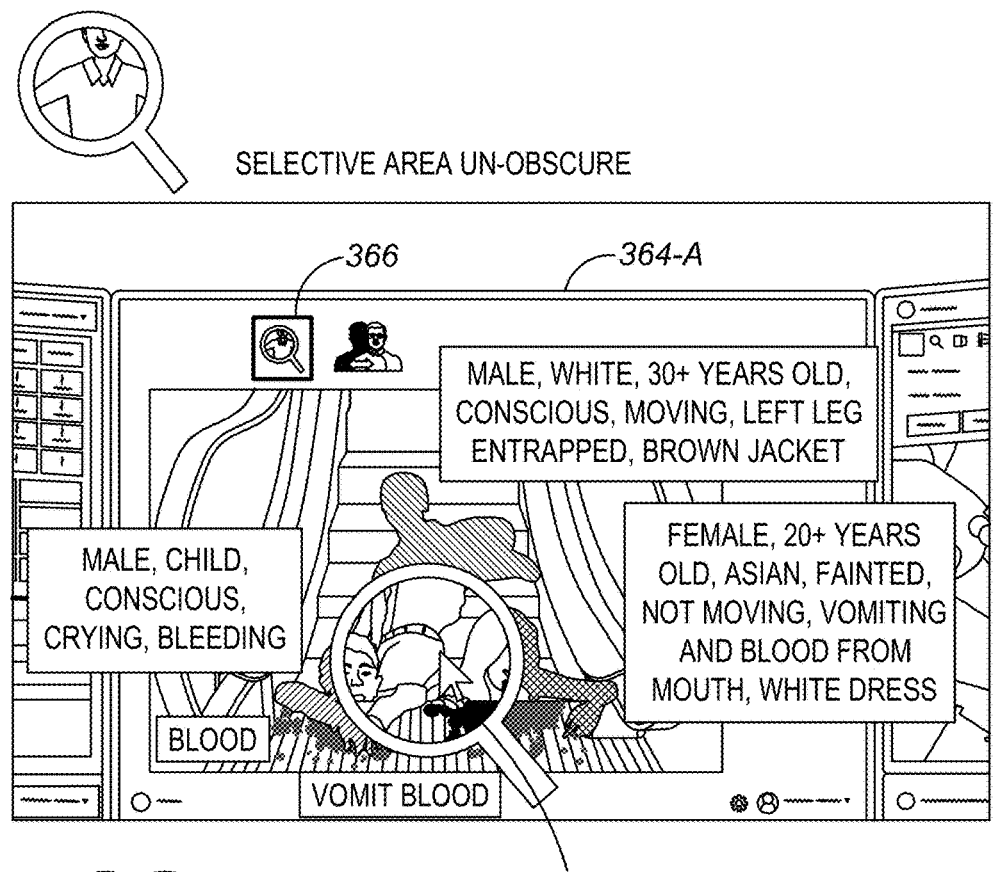
FIG. 3 is an example of selective un-obscuring that may be utilized with the emergency call taker mental health improvement techniques described herein.
Figure 3:
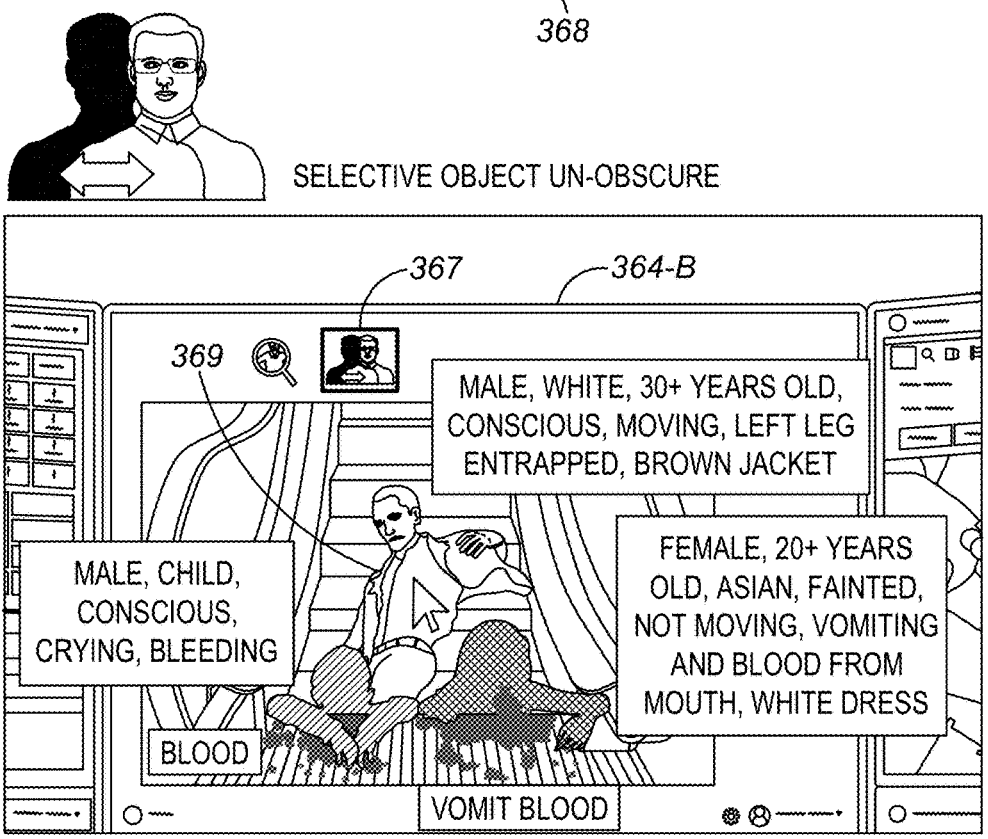

FIG. 3 is an example of selective un-obscuring that may be utilized with the emergency call taker mental health improvement techniques described herein. In some cases, the emergency call taker may wish to un-obscure the obscured object, even though the unobscured object may cause mental distress. For example, the emergency call taker may need to see the unobscured object to determine what the appropriate response should be. For example, sending an ambulance vs sending a coroner. Regardless of the reason, the emergency call taker may wish to un-obscure an obscured object.

The techniques described herein provide for two separate ways in which objects can be un-obscured. FIG. 3 shows obscured incident related media 364-A, which is the same as described with respect to FIG. 2. Unobscured incident related media may be presented to an emergency call taker on their workstation which may provide a selective area un-obscure tool 366. The selective area unobscured tool may allow the emergency call taker to select an area (e.g. magnifying glass pointer, bounding box selection tool, free form area selection tool, etc.). Anything that is obscured within the selected area may then be un-obscured. It should be understood that this may mean that objects that are partially within and partially outside the selected area may be partially un-obscured. As shown in FIG. 3, an area 368 is selected via a magnifying glass area selection tool that includes portions of each of the three victims. Only the selected portions of each of those three victims is unobscured, while the remainder remains obscured.

FIG. 3 also shows obscured incident related media 364-B, which is again the same as described with respect to FIG. 2. Unobscured incident related media may be presented to an emergency call taker on their workstation which may provide a selective object un-obscure tool 367. The selective object un-obscure tool may allow the emergency call taker to select 369 an individual object within the obscured incident related media. As shown, in the example in obscure incident related media 364-B, the male victim is selected. Thus, object recognition and video analytic processing is performed to determine the boundary of the selected object (in this example, the image boundary of the male victim), the entirety of the male victim is un-obscured, while all other objects remain obscured.

Figure 4A:
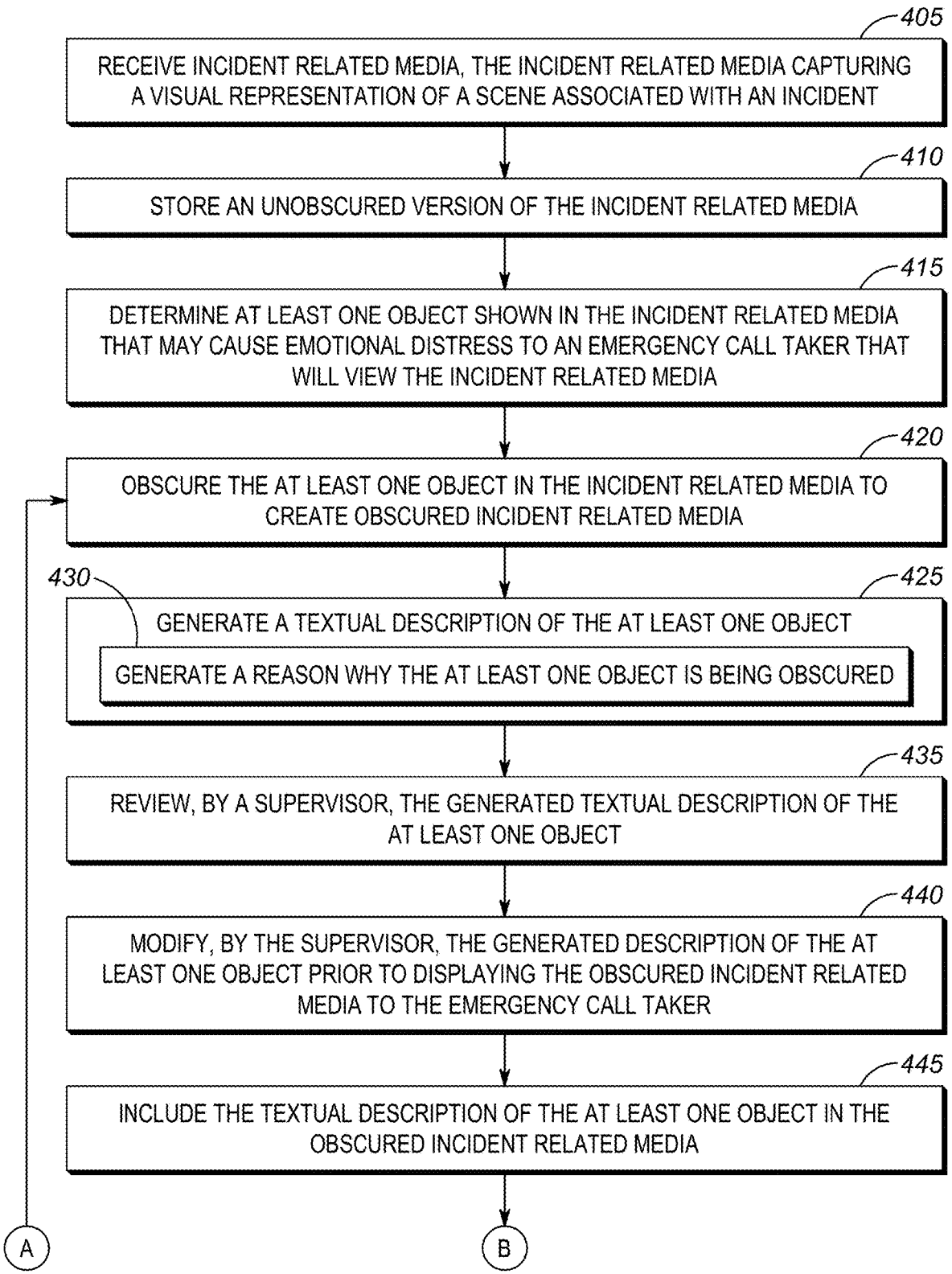
FIGS. 4A and 4B are an example flow diagram illustrating the emergency call taker mental health improvement techniques described herein.
Figure 4B:
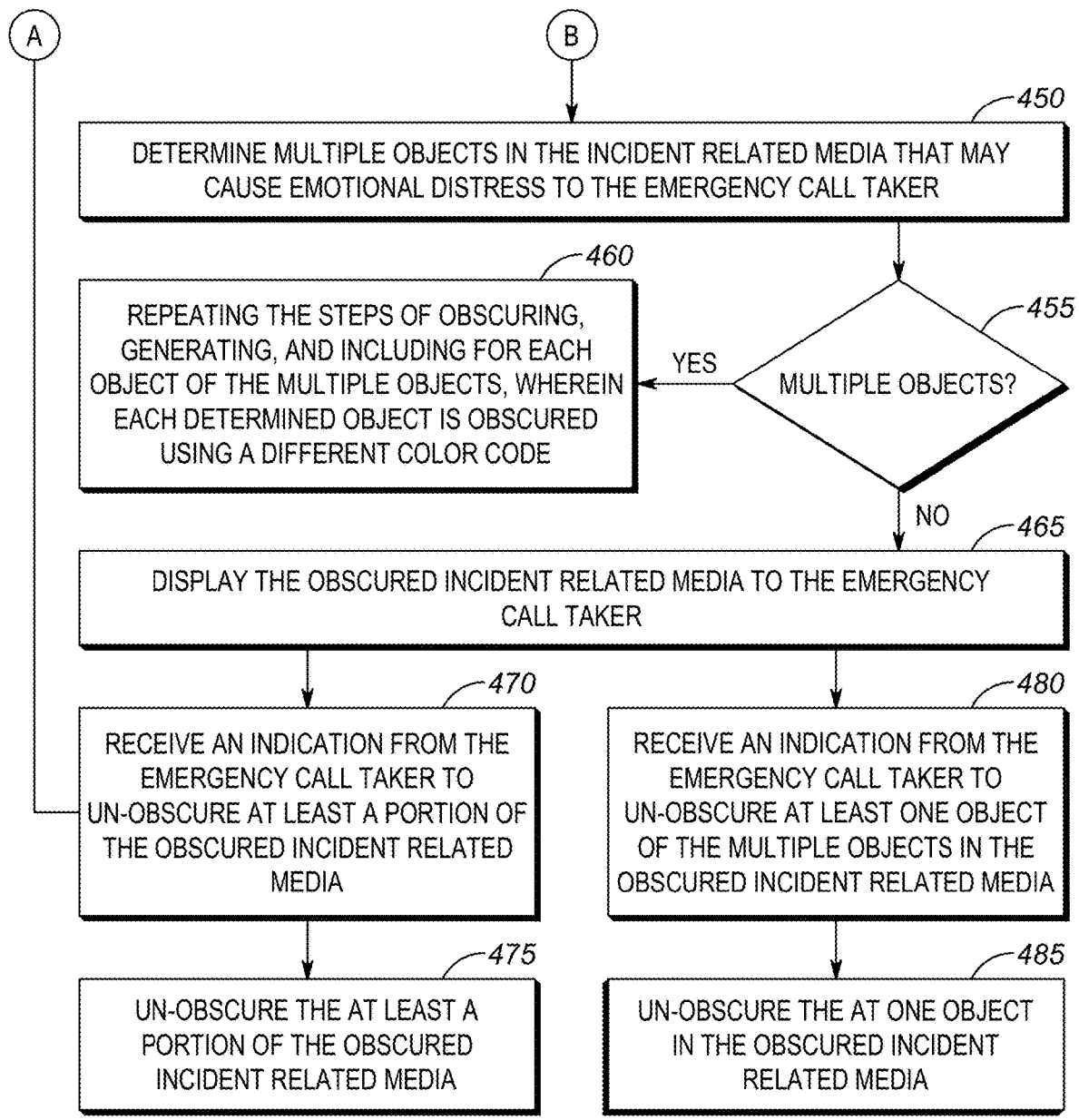

FIGS. 4A and 4B are an example flow diagram illustrating the emergency call taker mental health improvement techniques described herein. In block 405, incident related media may be received, the incident related media capturing a visual representation of a scene associated with an incident. For example, the incident related media may be a video of an incident scene captured by an emergency caller who is reporting the incident to an emergency call taking system, such as a call to 911. The media may have been captured using any type of image capture device as has been described above.

In block 410, an unobscured version of the incident related media may be stored. Although the techniques described in this disclosure relate to obscuring objects in incident related media in order to improve emergency call takers mental health, the original unobscured incident related media is still evidence. Such evidence, in unaltered form may be needed in later proceedings (e.g. court proceedings, etc.). What should be understood is that the original, unobscured incident related media always remains available and is not discarded.

In block 415, it may be determined that at least one object shown in the incident related media may cause emotional distress to an emergency call taker that will view the incident related media. In other words, an object, such as those described with respect to FIGS. 1-3 may be determined to have characteristics that may be harmful to an emergency call taker's mental health if the emergency call taker were to view the object. As explained, such objects can include injured persons, bodily fluids, damage to structures that may contain people, images of natural disasters, etc. Mental health issues and emotional distress may be used interchangeably. As discussed earlier, the threshold of determining if an object may be mentally disturbing can be automatically adjusted based on factors that were previously mentioned above.

In block 420, the at least one object in the incident related media may be obscured to create obscured incident related media. The object can be obscured using many different techniques. For example, the object may be blurred. The object may be replaced with an image and/or icon. The object may be blacked (or some other color) out. The techniques described herein are not dependent on any particular technique used for obscuring the object. What should be understood is that regardless of the technique used, the obscured image is of a type that in and of itself should not cause mental distress on the part of an emergency call taker. As discussed earlier, the level of obscuring on an object can be automatically changed based on factors that were previously mentioned above.

In block 425, a textual description of the at least one object may be generated. For example, if the object that is to be obscured is an injured person, a description of the person may be generated (e.g. injured Asian male, mid 30's, green shirt, black pants, severed torso, amputated left foot, partially decapitated, etc.). In other words, a textual description, containing as much context information as is available, is generated for the image that is being obscured.

In block 430, a reason why the at least one object is being obscured may be generated. This reason may be included in the textual description of the at least one object that is being obscured. The reason may allow the emergency call taker to better determine if they wish to un-obscure the image at some point. For example, the image may be obscured due to the presence of bodily fluids (e.g. blood, etc.). A particular emergency call taker may not be particularly disturbed by the presence of bodily fluids and may decide to un-obscure the at least one object. A different emergency call taker may be overly sensitive to the presence of bodily fluids, and this reason may cause that emergency call taker to not un-obscure the at least one object.

In block 435, a supervisor may review the generated textual description of the at least one object. For example, the supervisor may review the generated textual description to determine if enough or too much mentally disturbing information is included in the generated textual description. In some cases, the generated textual description may include too many mentally disturbing details (e.g. male, decapitated, all limbs severed, etc.) when a simpler description (e.g. victim is deceased, etc.) may suffice. In other cases, the generated textual description may include too few details (e.g. victim is seriously injured, etc.) when a more detailed description would be more useful (e.g. victim is seriously injured, but appears to be moving, etc.). A supervisor may review the generated textual description to determine if it is appropriate.

In block 440, the supervisor may modify the generated description of the at least one object prior to displaying the obscured incident related media to the emergency call taker. For example, the supervisor may modify the generated textual description to provide the correct level of information to the emergency call taker without exposing the emergency call taker to text that would be unnecessarily harmful to the mental health of the emergency call taker. It should be noted that supervisor review of the generated textual description need not be included in every implementation. Furthermore, supervisor review of the generated textual description may be based on the availability of a supervisor at any given time. In addition, the changes of text and the obscure level modification being done by the supervisor for a particular call taker can be learned (e.g. through data tracking, deep learning or neural network) so that the same modification of text can be automatically be done before displaying to the particular emergency call taker. For example, if a supervisor always provides more detailed contextual information for a particular emergency call taker, the system can learn and automatically provide more detailed contextual info for that particular emergency call taker in the future. In another example, if a supervisor always un-obscures a blood image or reduces the obscure level of the blood image for a particular emergency call taker, the system can learn and automatically determine a blood image does not necessarily need to be obscured for this particular emergency call taker in the future.

In block 445, the textual description of the at least one object may be included in the obscured incident related media. For example, the generated textual description may be superimposed on the at least one object to provide a description of the object that is being obscured. In other implementations, the generated description may be included in other portions (e.g. bottom of the media, top of the media, in the left or right margin of the media, etc.). What should be understood is that the generated textual description is provided to the emergency call taker in order for the emergency call taker to understand the object that has been obscured, and in some cases, why that object was obscured.

In block 450, multiple objects in the incident related media that may cause emotional distress to the emergency call taker may be determined. As explained above with respect to FIG. 2, in some incident scenes there may be multiple objects (e.g. people, etc.) that have the potential to cause mental distress to the emergency call taker if viewed by the emergency call taker. In block 455, it may be determined if there are multiple objects in the media that may cause distress to the emergency call taker. If multiple objects are determined, the process moves to block 460.

In block 460, the steps of obscuring, generating, and including for each object of the multiple objects may be repeated for each determined object that may cause emotional distress to the emergency call taker. In other words, for each object that may cause distress, the object is obscured, a textual description of the object is generated, and the textual description is included in the obscured incident related media. Thus, at the end of the process the obscured incident related media may include no objects that may cause distress to the emergency call taker and also include a generated text description for each of those objects.

It should be further understood that if multiple objects are identified, the objects may be obscured in different ways, so as to provide the ability for the objects to be distinguished from one another. For example, as shown FIG. 2, there may be multiple victims associated with an incident. Each victim may be given a distinct obscuring characteristic. For example, each object may be assigned a color code and is obscured using that color. Other examples, could include using a separate pattern, a separate icon, a separate shape, or any other obscuring technique that would allow different objects to be distinguished.

If there are no additional objects, the process moves to block 465. In block 465, the obscured incident related media may be displayed to the emergency call taker. At this point, all objects that may have the potential to cause emotional distress to the emergency call taker may have been obscured and replaced with the generated textual description of the object that has been obscured. This generated text description may be used by the emergency call taker when determining if an obscured image should be unobscured.

In some cases, the emergency call taker may determine that some of the obscured media should be unobscured. In block 470, an indication may be received from the emergency call taker to un-obscure at least a portion of the obscured incident related media. For example, as described in FIG. 3, the emergency call taker may wish to un-obscure a defined area of the obscured incident related media. The emergency call taker may specify the area using any number of techniques (e.g. bounding box, freehand selection of an area to unobscured, etc.). The emergency call taker may in fact select the entire area, indicating that nothing in the original incident related media should be obscured.

In block 475, the indicated at least a portion of the obscured incident media may be unobscured. It should be noted that this may include un-obscuring portions of an object, because only a portion of an object may have been included in the selected area.

In block 480, an indication may be received from the emergency call taker to un-obscure at least one object of the multiple objects in the obscured incident related media. As explained above, in some cases each object may be obscured with a distinct characteristic (e.g. a color, a pattern, a shape, etc.). An emergency call taker may select an individual object to un-obscure. For example, as described with respect to FIG. 2, the incident related video may include three victims, each representing an object to be obscured. The emergency call taker may wish to unobscured one victim while leaving the remaining victims obscured. In block 485, the at one object in the obscured incident related media may be un-obscured. It should be noted that when either an object or a portion of the obscured incident related media is un-obscured, in some implementations, the generated textual descriptions may remain. In other implementations, un-obscuring an object causes the generated textual description to be removed.

Figure 5:
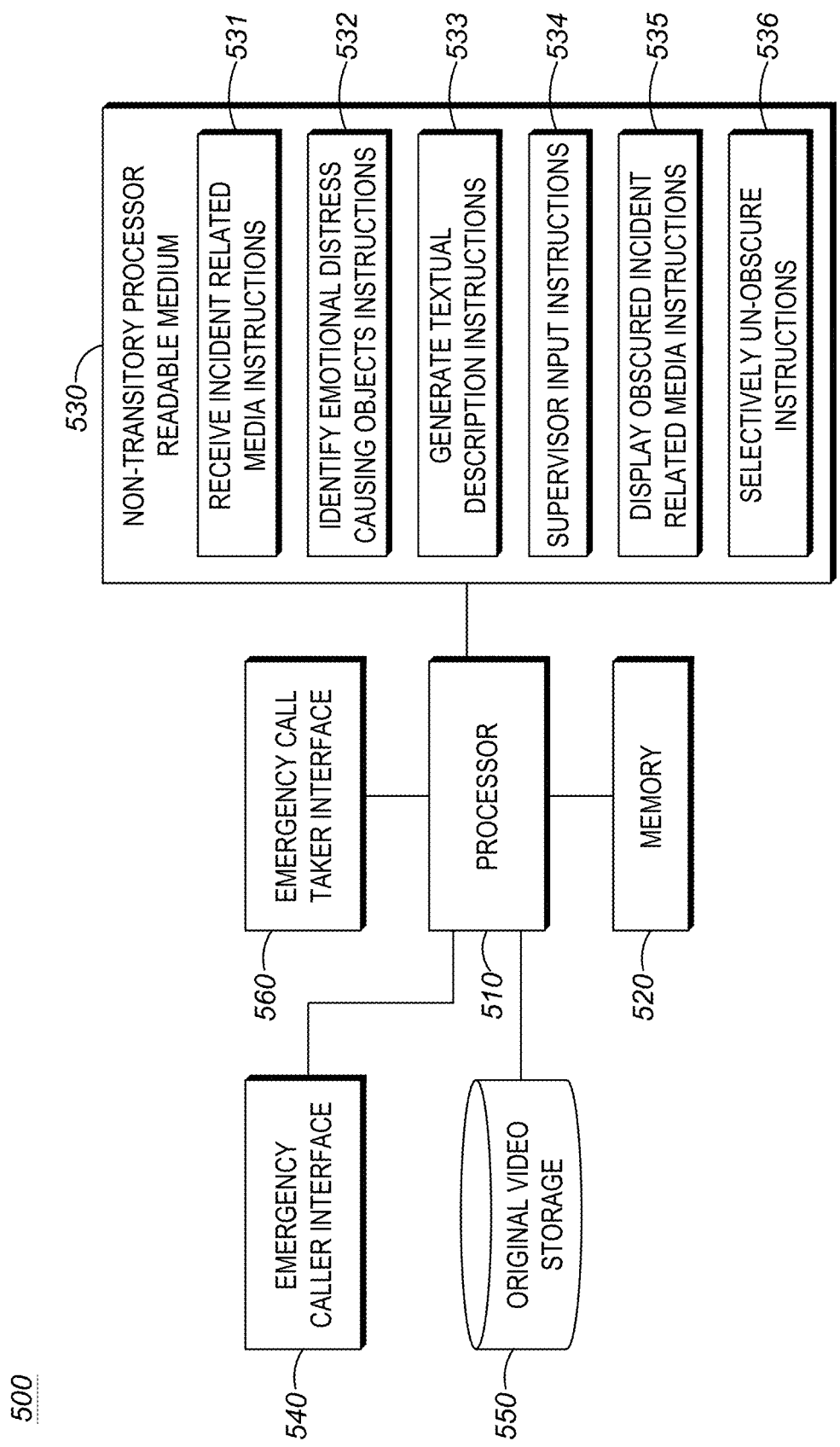
FIG. 5 is an example computing device that may implement the emergency call taker mental health improvement techniques described herein.

FIG. 5 is an example computing device that may implement the emergency call taker mental health improvement techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, audio analytics, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, emergency caller interface 540, original video storage 550, and emergency call taker interface 560.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include receive incident related media instructions 531. The receive incident related media instructions 531 may cause the processor to receive incident related media from emergency callers via the emergency caller interface and store the received media. The emergency caller interface may be how the emergency callers access the emergency call handling system (e.g. the 911 system, etc.). This may include using the wired or wireless telephone network or via computer networks such as the internet. What should be understood is that emergency callers send incident related media to the emergency call handling system via interface 540 and receive incident related media instructions 531 cause the processor to receive such media. The receive incident related media instructions 531 are described throughout the description generally, including places such as the descriptions of blocks 405 and 410.

The medium 530 may also include identify emotional distress causing objects instructions 532. The identify emotional distress causing objects instructions 532 may cause the processor to analyze the media received via the emergency caller interface 540 to identify objects in the media that may be mentally disturbing to emergency call takers. The identify emotional distress causing objects instructions 532 are described throughout this description generally, including places such as the description of blocks 415, and 450-460.

The medium 530 may also include generate textual description instructions 533. The generate textual description instructions 533 may generate a textual description of the objects identified by the identify emotional distress causing objects instructions 532. These generated descriptions may be presented to the emergency call taker. The generate textual description instructions 533 are described throughout this description generally, including places such as the description of blocks 425 and 430.

The medium 530 may include supervisor input instructions 534. The supervisor input instructions 534 may cause the processor to receive input from a supervisor related to selecting objects to be obscured or to modify the generated descriptions of those objects, so as to be more useful for presentation to the emergency call taker. The supervisor input instructions 534 are described throughout this description generally, including places such as the description of blocks 435 and 440.

The medium 530 may include display obscured incident related media instructions 535. The display obscured incident related media instructions 535 may cause the processor to generate obscured incident related media by obscuring the objects identified by the identify emotional distress causing objects 532 instructions. The instructions may also cause the processor to include the generated textual descriptions in the obscured incident related media. The instructions may cause the processor to display the obscured incident related media to the emergency call taker via the emergency call taker interface 560. For example, the emergency call taker interface 560 may be an interface to a workstation used by an emergency call taker. The display obscured incident related media instructions 535 are described throughout this description generally, including places such as the description of blocks 420, 445, and 465.

The medium 530 may also include selectively un-obscure instructions 536. The selectively un-obscure instructions 536 may cause the processor to receive an indication from the emergency call taker to un-obscure objects or portions of objects in the obscured incident related media and selectively un-obscure those objects or portions of objects. The selectively un-obscure instructions 536 are described throughout this description generally, including places such as the description of blocks 470-485.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving incident related media, the incident related media capturing a visual representation of a scene associated with an incident;
   determining at least one object shown in the incident related media that may cause emotional distress to an emergency call taker that will view the incident related media, wherein the at least one object may cause emotional distress when the at least one object includes at least one of an injured person and bodily fluids;
   obscuring the at least one object in the incident related media to create obscured incident related media;
   generating a textual description of the at least one object;
   including the textual description of the at least one object in the obscured incident related media; and
   displaying the obscured incident related media to the emergency call taker.

2. The method of claim 1 wherein generating the textual description of the at least one object further comprises:
   generating a reason why the at least one object is being obscured.

3. The method of claim 1 further comprising:
   storing an unobscured version of the incident related media.

4. The method of claim 1 further comprising:
   receiving an indication from the emergency call taker to un-obscure at least a portion of the obscured incident related media; and
   un-obscuring the at least a portion of the obscured incident related media.

5. The method of claim 1 further comprising:
   reviewing, by a supervisor, the generated textual description of the at least one object; and
   modifying, by the supervisor, the generated description of the at least one object prior to displaying the obscured incident related media to the emergency call taker.

6. The method of claim 1 further comprising:
   determining multiple objects in the incident related media that may cause emotional distress to the emergency call taker;
   repeating the steps of obscuring, generating, and including for each object of the multiple objects, wherein each determined object is obscured using a different color code.

7. The method of claim 6 further comprising:
   receiving an indication from the emergency call taker to un-obscure at least one object of the multiple objects in the obscured incident related media; and
   un-obscuring the at least one object in the obscured incident related media.

8. A device comprising:
   a processor; and a memory coupled to the processor, the memory containing a set of instructions thereon that when executed by the processor cause the processor to:
  receive incident related media, the incident related media capturing a visual representation of a scene associated with an incident;
  determine at least one object shown in the incident related media that may cause emotional distress to an emergency call taker that will view the incident related media, wherein the at least one object may cause emotional distress when the at least one object includes at least one of an injured person and bodily fluids;
  obscure the at least one object in the incident related media to create obscured incident related media;
  generate a textual description of the at least one object;
  include the textual description of the at least one object in the obscured incident related media; and
  display the obscured incident related media to the emergency call taker.

9. The device of claim 8 wherein generating the textual description of the at least one object further comprises instructions that cause the processor to:
  generate a reason why the at least one object is being obscured.

10. The device of claim 8 further comprising instructions that cause the processor to:
  store an unobscured version of the incident related media.

11. The device of claim 8 further comprising instructions that cause the processor to:
  receive an indication from the emergency call taker to un-obscure at least a portion of the obscured incident related media; and
  un-obscure the at least a portion of the obscured incident related media.

12. The device of claim 8 further comprising instructions that cause the processor to:
  review, by a supervisor, the generated textual description of the at least one object; and
  modify, by the supervisor, the generated description of the at least one object prior to displaying the obscured incident related media to the emergency call taker.

13. The device of claim 8 further comprising instructions that cause the processor to:
  determine multiple objects in the incident related media that may cause emotional distress to the emergency call taker;
  repeat the steps of obscuring, generating, and including for each object of the multiple objects, wherein each determined object is obscured using a different color code.

14. The device of claim 13 further comprising instructions that cause the processor to:
  receive an indication from the emergency call taker to un-obscure at least one object of the multiple objects in the obscured incident related media; and
  un-obscure the at least one object in the obscured incident related media.

15. A non-transitory processor readable medium containing a set of instructions thereon that when executed by the processor cause the processor to:
  receive incident related media, the incident related media capturing a visual representation of a scene associated with an incident;
  determine at least one object shown in the incident related media that may cause emotional distress to an emergency call taker that will view the incident related media, wherein the at least one object may cause emotional distress when the at least one object includes at least one of an injured person and bodily fluids;
  obscure the at least one object in the incident related media to create obscured incident related media;
  generate a textual description of the at least one object;
  include the textual description of the at least one object in the obscured incident related media; and
  display the obscured incident related media to the emergency call taker.

16. The medium of claim 15 wherein generating the textual description of the at least one object further comprises instructions that cause the processor to:
  generate a reason why the at least one object is being obscured.

17. The medium of claim 15 further comprising instructions that cause the processor to:
  store an unobscured version of the incident related media.

18. The medium of claim 15 further comprising instructions that cause the processor to:
  receive an indication from the emergency call taker to un-obscure at least a portion of the obscured incident related media; and
  un-obscure the at least a portion of the obscured incident related media.

19. The medium of claim 15 further comprising instructions that cause the processor to:
  determine multiple objects in the incident related media that may cause emotional distress to the emergency call taker;
  repeat the steps of obscuring, generating, and including for each object of the multiple objects, wherein each determined object is obscured using a different color code.

20. The medium of claim 19 further comprising instructions that cause the processor to:
  receive an indication from the emergency call taker to un-obscure at least one object of the multiple objects in the obscured incident related media; and
  un-obscure the at least one object in the obscured incident related media.

* * * * *